United States Patent Office 3,368,134
Patented Feb. 6, 1968

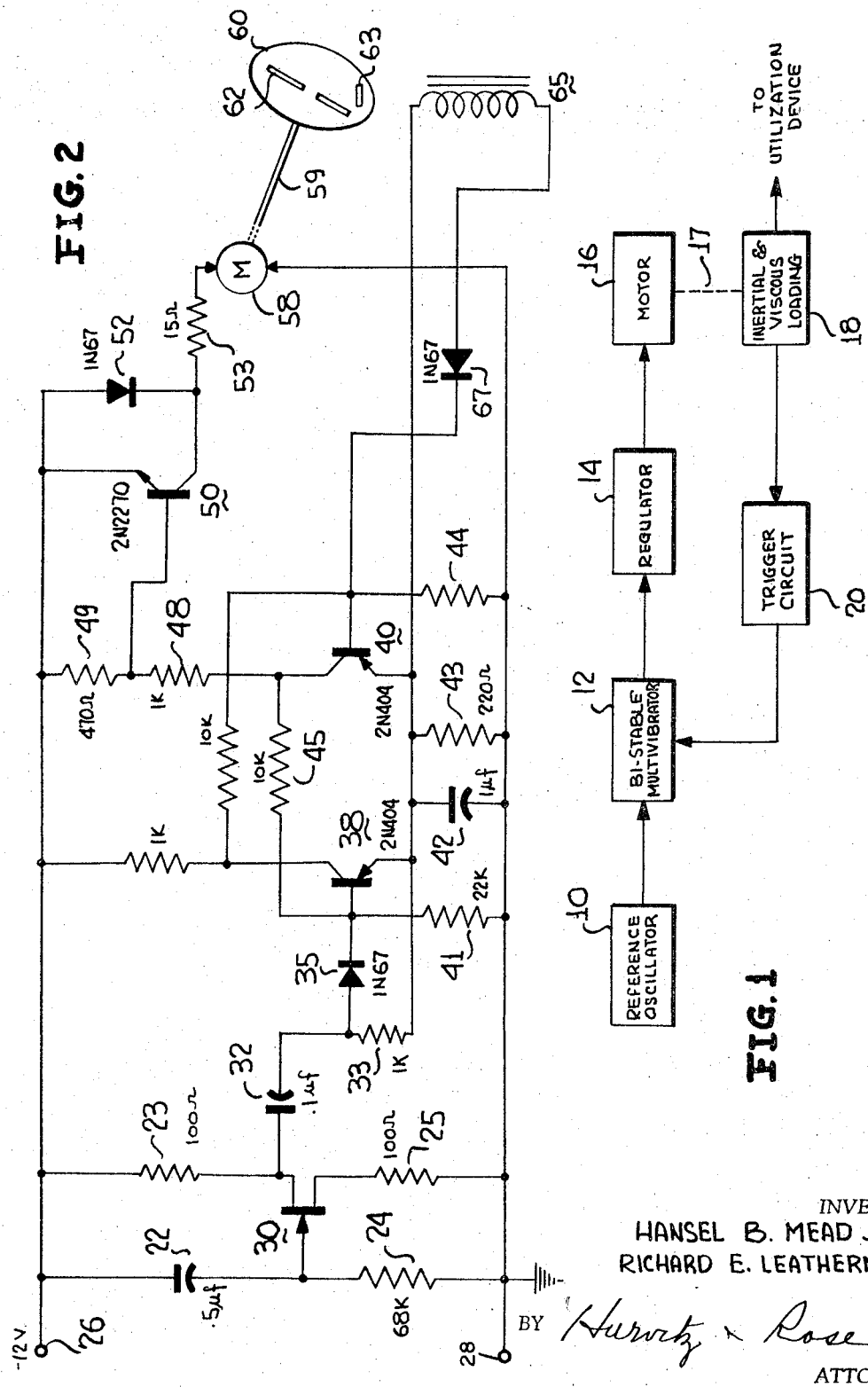

3,368,134
ROTATABLE MEMBER SPEED CONTROL SYSTEM HAVING ROTATIONAL FREQUENCY AMBIGUITY RESOLVER
Hansel B. Mead, Jr., 1975 Coolidge Ave., and Richard E. Leatherman, 2028 Maid Marion, both of Eau Gallie, Fla. 32935
Filed Oct. 16, 1964, Ser. No. 404,466
10 Claims. (Cl. 318—318)

ABSTRACT OF THE DISCLOSURE

In a speed control system a bistable multivibrator is triggered to a first stable state at the frequency of pulses derived from and proportional to the output frequency of a fixed reference frequency source and to the second stable state at the frequency of pulses derived from and proportional the rotational frequency of a motor shaft. Power is supplied to the motor over the interval of time the multivibrator is in the first stable state and is removed during the time interval associated with operation of the multivibrator in the second stable state, such that the shaft assumes a rotational frequency and phase dictated by the frequency and phase of the reference source. Any tendency for the motor to lock on a harmonic of the reference frequency, i.e., ambiguity, is resolved by viscous loading or damping of the shaft in proportion to angular velocity to an extent sufficient to prevent sustained rotation at other than the reference frequency.

---

The present invention relates generally to control systems and more particularly to apparatus for synchronizing the rotational velocity and instantaneous angular position of a rotatable member in accordance with the frequency and phase of a reference signal.

In the prior art a variety of devices have been proposed for controlling the speed of a driven or rotatable member in accordance with the characteristics of a reference signal. Such devices find practical application, for example, in recording systems, phonographs and tracking systems. Typically, the control device is arranged to maintain a fixed relationship between the phase of the reference signal and the instantaneous angular position of the rotatable member, appropriate constraints being placed on the velocity of rotation of the member in proportion to the frequency of the reference signal. It is further commonplace to utilize in conjunction with such devices a closed loop stabilization network for purposes of eliminating any error or deviation in the above described relations. By and large the prior art devices of this type are complex and expensive, requiring specialized supervision apparatus to resolve ambiguities which arise in the phase and frequency relationships.

In accordance with the present invention, a rotatable member is maintained at an angular velocity in synchronism with the frequency of a fixed reference signal by provision of variable viscous loading of the rotatable member. In conjunction with a stabilization loop, a synchronization signal is derived in accordance with the motion of the rotatable member. The viscous damping of the rotatable member is adjusted to maintain a predetermined relation between the reference frequency and the synchronization signal frequency to prevent operation in multiple or submultiple frequency modes. In this manner the desired operation is produced by an extremely simple and inexpensive circuit.

Accordingly, it is a principal object of the present invention to provide an improved speed control system for a driven member.

It is a further object of the present invention to provide an improved system for controlling the rotational speed and instantaneous angular position of a rotating member in accordance with the frequency and phase of a reference signal.

It is another object of the present invention to provide stabilized lock-in of the rotation of a driven member in accordance with the frequency and phase of a reference signal.

Further objects, features and attendant advantages of the present invention will become apparent from a consideration of the following detailed description of a specific embodiment thereof, especially when taken in conjunction with the accompanying drawings wherein:

FIGURE 1 is a block diagram of an exemplary speed control system; and

FIGURE 2 is a schematic diagram of an embodiment of the circuit of FIGURE 1.

Referring now generally to the drawings, and more particularly to FIGURE 1, a speed control system in accordance with the invention comprises a reference oscillator 10 having a closely controlled output signal frequency irrespective of possible relatively wide variations in the operational power supplied thereto. The output signal of reference oscillator 10 is applied to a bistable multivibrator or flip-flop 12 to trigger the latter into one of its stable operating states. Multivibrator 12, in turn, supplies an output signal to signal regulator 14 for ultimate application of driving power to motor 16. The latter is a DC motor which may, for example, be of either series, shunt, or compound type. Shaft 17 of motor 16 is coupled for damped rotation to a viscous loading device 18, which will hereinafter be more fully described.

A signal representative of the angular speed and position of the shaft is derived from the motion of the loading device, or, alternatively, from the rotation of the shaft itself, as will be explained in connection with FIGURE 2, and is applied to a trigger circuit 20. In response to the derived signal, circuit 20 triggers multivibrator or flip-flop 12 into the other of its stable operating states, thereby opening the energy supply circuit.

In operation of the circuit of FIGURE 1, the signal from reference oscillator 10 is effective to trigger flip-flop 12 to provide operating power to motor 16, thus causing shaft 17 to rotate. Obviously, there will be a finite lapse of time before shaft 17 attains rotational speed at an angular frequency corresponding to the frequency of the reference signal. The shaft rotation-derived signal, applied through trigger circuit 20, will trigger flip-flop 12 to cut off power to the motor, but shaft 17 will, by virture of inertia, continue to rotate with decreasing velocity until the next application of power to the motor. The above described sequence will continue as the multivibrator is alternately switched from one stable operating state to the other.

The operating time of flip-flop 12 in each stable operating state will, however, be unequally apportioned until the frequency of the derived signal becomes equal to that of the reference signal. For exmaple, if the angular rotation frequency of the shaft is less tahn the frequency of the reference signal, operational power will be supplied to the motor over relatively longer time intervals than those intervals during which no power is applied. That is, power is supplied to the motor in the form of pulses, each power pulse extending over the major portion of the period defined by one full cycle of the reference frequency. As shaft speed increases, the time interval between successive cutoff signals will decrease proportionally, resulting in a reduction in the duration of the power pulses. When the angular frequency of rotation of the shaft becomes equal to the reference frequency, each power pulse will have a time base substantially equal to one-half cycle of the reference.

The viscous loading of the shaft results in an increase in retarding force, i.e., an opposing torque, with increasing shaft speed. By appropriate adjustment of the viscous loading, or damping, in accordance with the desired frequency of the reference signal, the angular rotation of the shaft may be locked to the frequency and phase of the reference signal. That is, the available energy of the control system may be regulated, by virtue of the damping feature, to lock the angular rotation of the shaft, within prescribed limits, to the frequency and phase of the reference signal. Operation of the control system is thus enhanced in a simple and effective manner by the frictional viscous damping.

FIGURE 2 illustrates exemplary circuitry for the system of FIGURE 1. A pair of terminals 26, 28 are arranged to be connected to a suitable source of power, such as a battery, an AC-to-DC converter or other appropriate DC power supply (not shown). Reference oscillator 10 of FIGURE 1 comprises a unijunction transistor 30 with associated resistive and capacitive biasing and feedback components 23, 24, 25 and 22, respectively. The unijunction transistor is preferred because the output signal frequency of the oscillator can be maintained relatively constant over a wide range of voltage supply levels. That is, the negative resistance characteristics of the unijunction transistor will permit the specification of a fixed frequency signal despite significant variations in the voltage across the dual base electrodes.

The fixed frequency reference signal is applied to a differentiating network comprising capacitor 32 and resistor 33 to provide a series of impulses or spikes at the frequency of the reference signal. Positive impulses are passed by diode 35 and applied to the base of transistor 38. Transistors 38 and 40 are PNP transistors which, in conjunction with associated resistors and capacitor, are coupled to form a conventional symmetrical flip-flop, or bistable multivibrator. The flip-flop is biased for operation with a single power supply in a conventional manner by connection of resistor 43 from the junction of the emitters of transistors 38 and 40 to the ground conductor. Capacitor 42 is provided to smooth out fluctuations arising from switching transients.

Upon application of each positive impulse to the base of transistor 38, transistor 40 is rendered conductive and the flip-flop is in one of its stable operating states. The output voltage of the flip-flop taken via a conductor connected between resitsors 48 and 49, is applied to NPN transistor 50, which has a diode 52 connected across its emitter and collector electrodes. The circuit comprising transistor 50, diode 52 and resistor 53 is a wave shaping or regulating network for supplying positive operating voltage pulses to a motor 58. The current flowing through the DC motor windings will produce rotation of shaft 59.

Shaft 59 has connected thereto a fly wheel disk 60 having fins or fan blades 62 disposed thereon to provide air loading in response to rotation. Thus, as shaft 59 rotates with increasing angular velocity there is an increase in the frictional viscous damping thereof by virtue of the retarding effect of the fins. It will be understood that the illustrated loading device is exemplary, and that alternative means for providing the viscous damping may be employed, as desired. For example, suitable loading of the motor may also be provided by locating a stationary metal disk adjacent a magnet disposed on the motor shaft. Rotation of the magnet with respect to the stationary disk will result in induced eddy currents in the disk to produce an opposing torque on the shaft.

In the illustrated embodiment, disk 60 has a permanent magnet 63 attached thereto. An iron core coil 65 is disposed adjacent the path of the magnet such that a signal is induced in the coil at the angular frequency of rotation of the shaft. Diode 67 clips the negative portions of the derived or induced signal prior to application thereof to the base electrode of transistor 40. The positive signal portion should be of sufficient level to drive transistor 40 to cutoff, and, to this end, an amplifier (not shown) may be provided in the circuit path between coil 65 and transistor 40. However, in the practical implementation of the circuit of FIGURE 2 we have found that the magnitude of the induced signal is of sufficient amplitude to provide the desired operation without need for a special amplifier.

When transistor 40 is rendered nonconductive, the flip-flop is in the second of its stable operating states, and the operational power to DC motor 58 is cut off. The next impulse applied to transistor 38 from the differentiating network will trigger the multivibrator into its first stable state to again supply power to the motor. In this manner, power pulses are applied to the motor to produce a rapidly alternating sequence in which the motor is successively switched on and off. Since a motor is an integrating device, the pulses are smoothed out and the shaft 59 will continue to rotate at decreasing speed during the short intervals in which the motor is switched off.

If the angular frequency of rotation of the shaft is of less than a predetermined proportionality to the frequency of the reference signal, the flip-flop will supply operational power to the motor over a longer duration of time than the time interval during which it is cut off. On the other hand, if the shaft should rotate with an angular frequency greater than this predetermined proportionality to reference frequency an induced or derived trigger signal is applied to transistor 40 more frequently than is the differentiated impulse signal applied to transistor 38, and the "off-time" of the motor will exceed its "on-time." The shaft speed will therefore undergo acceleration or deceleration, depending upon whether the angular frequency of rotation of the shaft is respectively less than or greater than the fixed frequency, in this particular embodiment, of the reference signal.

The control circuit of FIGURE 2 operates as a phase-locked closed loop system, but without the undesirable characteristics of ambiguious unstable locking at multiple or submultiple frequencies of the reference signal which have typified prior motor control systems. It will be apparent that the viscous damping device may be suitably adjusted to provide stable lock-in at the referenced oscillator frequency, as by modification of dimensions or number of fins, such that the motor losses will prevent an increase in angular velocity of the shaft above the desired predetermined proportionality to the reference frequency, while at submultiple frequencies of the reference signal the viscous damping will not be sufficient to balance available motor energy.

In the described embodiment the voltage applied at terminal 26 had a nominal value of −12 volts; however, phase and frequency lock-in of the DC motor to the reference signal was maintained over an input voltage range from −9 to −16 volts. The reference oscillator requency remained within 1% for the same voltage range. The component values and types in FIGURE 2 will be understood as being merely illustrative.

Moreover, it will be understood that various changes and modifications may become apparent from a consideration of the foregoing detailed description without departing from the true spirit and scope of the invention as defined by the appended claims.

We claim:
1. Apparatus for synnchronizing the angular frequency of rotation of a shaft with the frequency of a reference signal, said apparatus comprising means responsive to rotation of said shaft for generating a further signal having a frequency proportional to the angular velocity thereof, means responsive to said reference signal and to said further signal for respectively accelerating and decelerating the rotation of said shaft over sequentially alternate time intervals proportional to the frequencies of said signals, said shaft being capable of rotation in synchronism with harmonic frequencies of said reference signal, and means for loading said shaft in pro- portion to said angular velocity to such extent as to maintain said shaft rotation in synchronism with said reference signal frequency and to prevent sustained rotation at said harmonic frequencies.

2. The combination according to claim 1 wherein said means for loading said shaft is a frictional damping device comprising a disk coupled to said shaft and rotatable therewith, said disk having a plurality of fins disposed thereon for providing viscous resistance to said shaft rotation.

3. The combination according to claim 2 wherein said means for generating further signal comprises magnetic means coupled to said shaft and rotatable therewith, and inductive means disposed adjacent the path of rotation of said magnetic means.

4. Apparatus for controlling the speed of a DC motor shaft in accordance with the frequency of a reference signal, comprising switch means having conductive and non-conductive states, said switch means being responsive to said reference signal to assume said conductive state and to provide energy to said motor only during the interval of time said switch means is in said conductive state, means responsive to the rotation of said shaft to generate a variable frequency signal having a frequency proportional to the angular velocity thereof, said switch means being responsive to said variable frequency signal to assume said non-conductive state, said switch means alternating between said conductive and non-conductive states for time intervals proportional respectively to the frequencies of said reference signal and said variable frequency signal, and means for producing a torque opposing said shaft rotation sufficient in extent and of character to maintain said shaft rotation in synchronism with said reference signal frequency and to inhibit sustained rotation at harmonic frequencies of said reference signal.

5. The combination according to claim 4 wherein said means for producing said opposing torque comprises a disk having a plurality of fins disposed thereon, said disk being coupled to said shaft and rotatable therewith to frictionally resist said rotation in proportion to the angular velocity thereof.

6. The combination according to claim 5 wherein said means for generating said variable frequency signal comprises magnetic means coupled to said shaft and rotatable therewith, and inductive means disposed adjacent the path of said magnetic means.

7. In a motor speed control system having means for regulating the angular velocity of rotation of the motor shaft in accordance with the frequency and phase of a control signal, and wherein the motor shaft is capable of rotation in synchronism with harmonic frequencies of said control signal, the improvement comprising variable loading means coupled to said shaft to stabilize said rotation thereof at said control signal frequency, said variable loading means including means for dissipating energy supplied to said motor for harmonic angular velocity which is in excess of that which can be sustained by said motor.

8. In a motor speed control system for synchronizing the angular frequency and phase of rotation of the shaft of the motor with the frequency and phase of a reference signal, the combination comprising
a stable oscillator for generating a reference frequency proportional to a desired frequency at which said shaft is to be rotated,
a bistable multivibrator,
means for applying to said multivibrator trigger pulses derived from and proportional in frequency to said reference frequency for driving said multivibrator to a first stable state,
pulse regulating means for supplying power to said motor in response to application of power pulses thereto,
means connecting said multivibrator to said regulating means for applying pulses to said regulating means when said multivibrator is in said first stable state,
means for detecting the frequency of rotation of said shaft and for generating trigger pulses derived from and proportional in frequency to said rotational frequency, said multivibrator responsive to the last-named trigger pulses for assuming the second stable state thereof, whereby power pulses are applied to said motor only during the time interval said multivibrator is in the first stable state as determined by the relative frequency of application of the first named and said last named trigger pulses thereto, and
means coupled to said shaft for exerting a viscous load thereon of magnitude proportional to the frequency of rotation of said shaft to prevent sustained shaft rotation at a harmonic of said desired frequency.

9. The invention according to claim 8 wherein said viscous load-exerting means comprises a finned disk fastened to said shaft.

10. The invention according to claim 9 wherein said stable oscillator includes
a unijunction transistor;
means for differentiating the output signal of said oscillator to produce said first-named trigger pulses; and
said pulse regulating means comprising means for shaping said pulses and supplying to said motor only pulses of a preselected polarity.

References Cited
UNITED STATES PATENTS

| 2,809,339 | 10/1957 | Guggi | 318—327 |
| 3,042,820 | 7/1962 | Diamond | 318—302 X |
| 3,234,447 | 2/1966 | Sauber | 318—345 X |
| 3,257,595 | 6/1966 | Polakowski | 318—341 X |

ORIS L. RADER, *Primary Examiner.*

J. J. BAKER, *Assistant Examiner.*